Nov. 19, 1935.  C. H. BARTON  2,021,165
TRANSMISSION
Filed Dec. 29, 1930  3 Sheets-Sheet 1
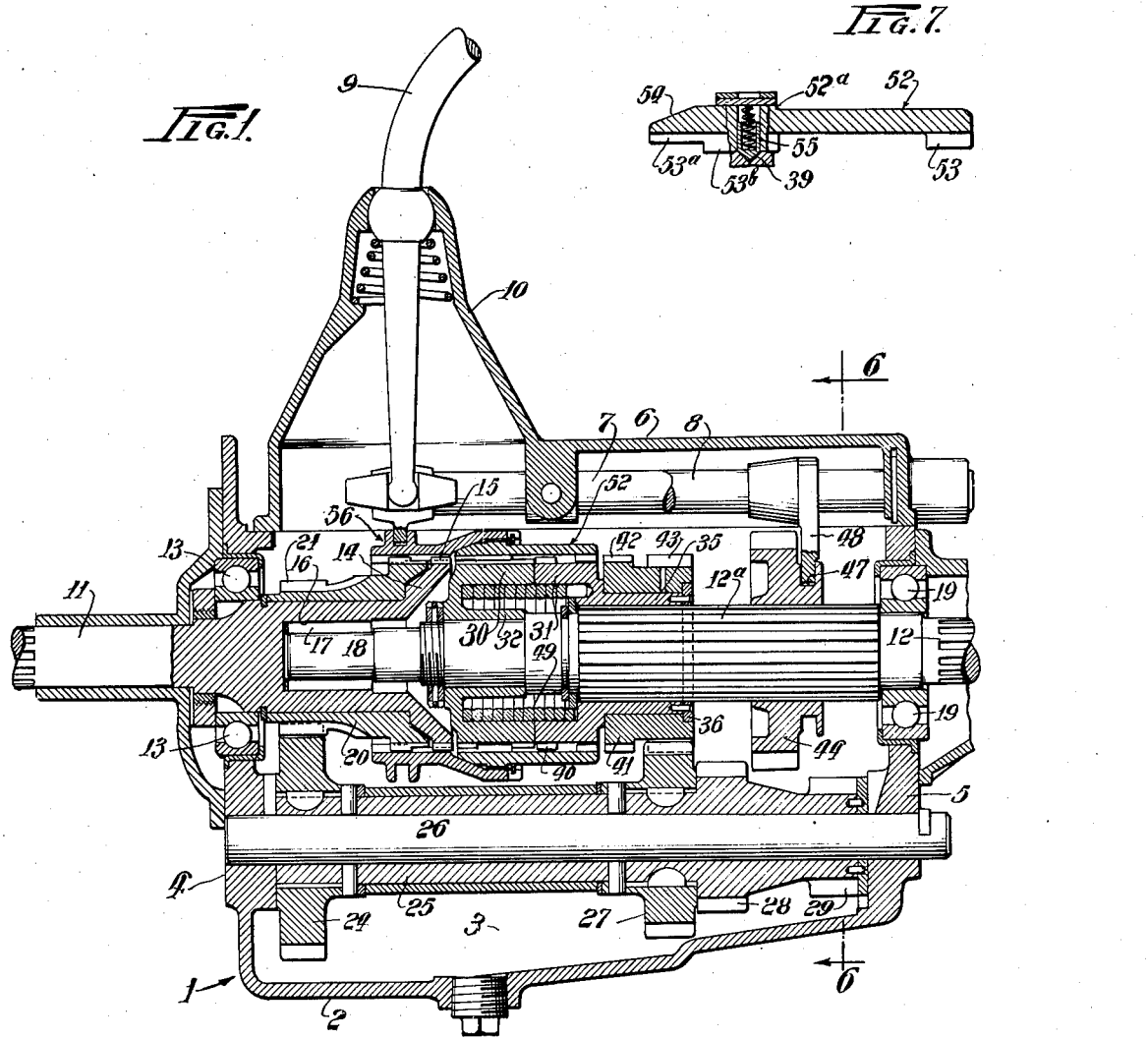
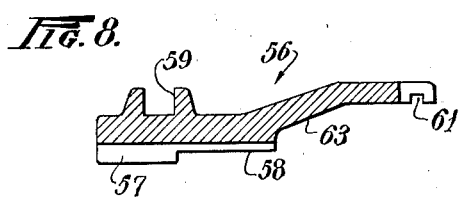
Inventor:
Clarence H. Barton
By: Arthur W. Wilson
Att'y.

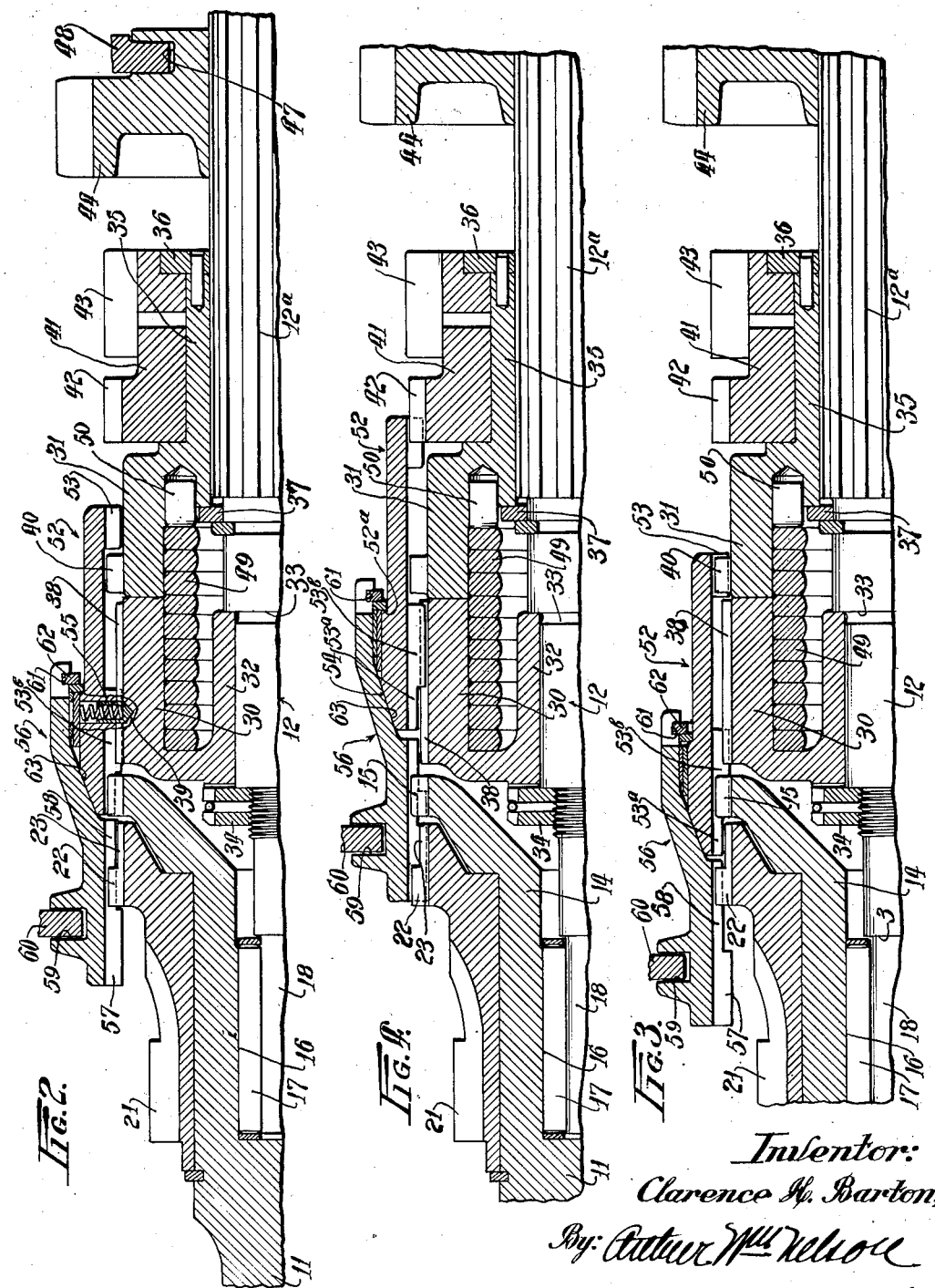

Nov. 19, 1935.  C. H. BARTON  2,021,165

TRANSMISSION

Filed Dec. 29, 1930      3 Sheets-Sheet 3

Inventor:
Clarence H. Barton,
By: Arthur M. Nelson
Atty.

Patented Nov. 19, 1935

2,021,165

UNITED STATES PATENT OFFICE 2,021,165

TRANSMISSION

Clarence H. Barton, Indianapolis, Ind., assignor, by mesne assignments, to William C. Starkey, Raymond S. Pruitt, and Walter H. Beal, trustees Application December 29, 1930, Serial No. 505,231

18 Claims. (Cl. 74—333)

This invention relates to improvements in transmissions and it consists of the matters hereinafter described and more particularly pointed out in the appended claims.

My invention is especially adapted for use in transmissions of automotive vehicles and it will be so described, but as will be apparent, certain of the features thereof may also be used for other purposes where the peculiar characteristics of the invention make it of advantage to do so.

The primary object of the invention is to provide a transmission of this kind wherein free wheeling is possible in either high or intermediate gear.

Another object of the invention is to provide a transmission of this kind wherein all change speed gears are in mesh but are non-rotative or passive while the associated vehicle is being driven in high gear.

A further object of the invention is to provide a transmission of this kind wherein the second gear is in constant mesh with its associated jack shaft gear.

These objects of the invention together with others as well as the many advantages thereof will more fully appear as I proceed with my specification.

In the drawings:—

Fig. 1 is a longitudinal vertical sectional view through a transmission embodying my invention.

Figs. 2, 3, 4 and 5 are fragmentary views on an enlarged scale of a portion of the structure shown in Fig. 1 with parts thereof in changed relation and which will be more fully referred to later.

Figs. 7 and 8 are longitudinal detail vertical sectional views through certain shiftable collars or sleeves embodied in my invention to be more fully referred to later, and show the position of the internal teeth thereof.

Figure 6:
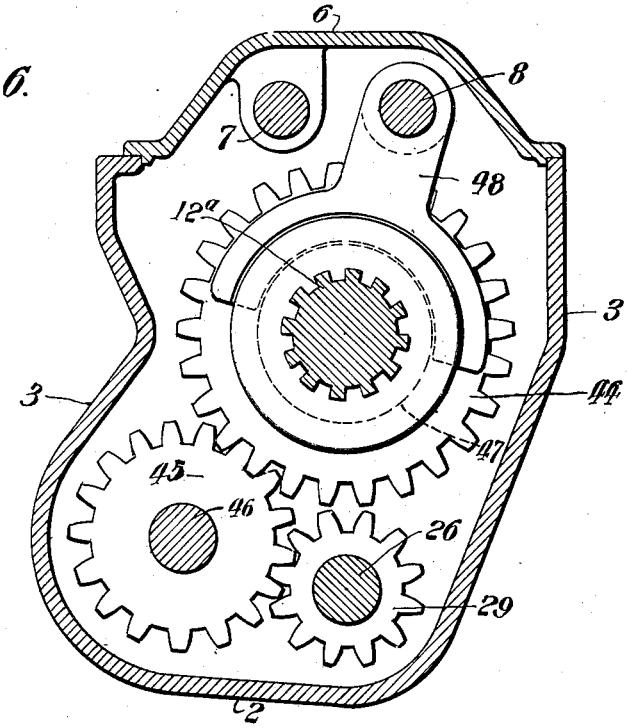
Fig. 6 is a transverse vertical sectional view through the transmission as taken on the line 6—5 of Fig. 1.

Referring now in detail to that embodiment of the invention, illustrated in the accompanying drawings:—I indicates the casing of the transmission which has an open top and includes a bottom wall 2, side walls 3, and end walls 4 and 5. Associated with said casing and closing the open top thereof is a cover 6 which is held in place in any suitable manner. In said cover are the shift rods or rails 7 and 8, both formed at their front ends to be operatively engaged by the bottom end of a shift lever 9 having a ball and socket engagement in a hollow cone like housing 10 rising from one end of the cover 6.

The shift rod 7 is for the second and high gear of the transmission while the rod 8 is for the low and reverse gear of the transmission.

11 indicates the drive shaft of the transmission and this shaft is adapted to be connected with the engine (not shown) in any suitable manner. 12 indicates the coaxially disposed driven shaft of the transmission adapted to be connected up in any suitable manner, with the propeller shaft of the automobile with which the transmission is associated in any suitable manner.

The drive shaft 11 which is journalled in antifriction bearings 13 in the front wall 4 of the casing has a bell shaped enlargement 14 at its rear end and this enlargement is provided on its periphery with full spline teeth 15. In the rear end of said shaft 11 is an axial recess 16 to receive roller bearings 17 for the reduced front end portion 18 of the driven shaft 12. Said shaft 12 is journalled near its rear end in anti-friction bearings 19 in the rear wall 5 of the casing, and is longitudinally splined as at 12ᵃ for a suitable distance forward of said bearing for a purpose soon to appear.

The drive shaft 11 has journalled thereon, between the bearing 13 and the enlargement 14, a sleeve 20 which is provided at its front end with spur gear teeth 21 and at its rear end with two sets of spline teeth 22 and 23 respectively, the latter being dedendum teeth. The teeth 21 constantly mesh with the teeth of a gear 24 on the front end of a sleeve 25. This sleeve as shown in the drawings is journalled on a jack shaft 26 which extends between and is fixed at its ends in the front and rear walls of the casing. Also on the sleeve are gears 27, 28 and 29.

Journalled on the driven shaft 12 adjacent the enlarged end 14 of the drive shaft 11 is a cup shaped member 30 having a rearwardly facing annular recess therein. Associated with said member is a second cup shaped member 31 having a forwardly facing recess therein coacting with the recess of the member 30 to provide an interior clutch surface as will later appear. The cup shaped member 30 has a hub 32 that rotatively bears upon that part of the driven shaft 12 which is disposed between an annular shoulder 33 on the driven shaft, and a locking collar 34. The latter is threaded upon the driven shaft at a point in advance of the shoulder 33. The cup shaped member 31 includes a rearwardly extending hub 35 that has a splined connection with the splined part 12ᵃ of the driven shaft 12. Said member 31 is held against endwise movement on the shaft by end collars 36 and 37. The member 30 is provided on its periphery with dedendum spline teeth 38 and near the front end of this member between adjacent teeth 38 is formed a tapering recess 39 the purpose of which will appear later. On the front end of the member 31 are full spline teeth 40.

Rotative on the hub 35 of the cup shaped member 31 is a gear 41 which is held against endwise movement thereon by reason of its end engagement with said member 31 and with the collar 36 before mentioned. This gear has spline teeth 42 and gear teeth 43 at its front and rear ends respectively and these teeth are in constant mesh with those of the gear 27 on the jack shaft.

Longitudinally shiftable on the splined part 12ª of the shaft 12 between said gear 41 and the bearing 19 is a gear 44 which is adapted to be shifted into engagement either with the gear 28 on the jack shaft or with an idle reverse gear 45 on a shaft 46 in the casing (see Fig. 6) this reverse gear being normally in mesh with the gear 29 on the jack shaft. The gear 44 is provided on its rear surface with an annular groove 47 in which is engaged a shifter yoke 48 secured to the shift rod 8 so as to be actuated thereby.

In the pocket or recess as defined by the cup shaped members 30 and 31 is a relatively strong clutch spring 49 having an axially disposed toe 50 at one end extending into an opening in said member 31. The other end of the spring cooperates with the recess in the member 30 in such a manner that upon relative rotation of said members 30—31 in one direction, the spring is unwound and expands radially to clutch said members together for conjoint rotation. Upon relative rotation of said members in the other direction, the spring is wound up and radially contracts so that one member can over-run the other.

52 indicates a longitudinally movable sleeve or collar normally surrounding the cup shaped member 30 and the greater front end part of the cup member 31 when said sleeve or collar is in neutral position. This sleeve is provided at its rear end with internal spline teeth 53 and at its front end with internal spline teeth 53ª and 53ᵇ, the latter being full teeth and of a length greater than the former which are dedendum teeth. The front end of this sleeve or collar is tapered or coned exteriorly and at one point in said sleeve near a rearwardly facing, radial shoulder 52ª on said sleeve and opening through one of the full teeth 53ᵇ, thereof is a spring pressed detent or pin 55. This spring pressed detent or pin is adapted to enter the notch or recess 39 before mentioned in the cup member 30 when the sleeve 52 has been moved forwardly to bring said detent or pin into the plane of said notch or recess. The purpose of the detent and notch structure will appear later.

56 indicates a second longitudinally movable sleeve normally surrounding the rear end portion of the member 20 and the tapered front end portion of the sleeve 52. This sleeve 56 is provided at its front end with internal spline teeth 57 and 58 respectively the latter being dedendum teeth. On the exterior of said front end is provided an annular groove 59 in which is engaged a yoke 60 fixed to the shift rod 7. The rear end of said sleeve 56 projects beyond the annular shoulder 52ª of the sleeve 52 and has an internal annular groove 61 into which is sprung a locking ring 62 whereby, although a relative rotative movement may occur between said sleeves, they are both longitudinally movable without separation. In this respect, it is pointed out, that the sleeve 56 is provided at a point between the teeth 58 and locking ring groove 61 with an internal cone or tapered surface 63 to coact with the external taper or cone surface 54 on the front end of the sleeve member 52.

In Fig. 1, the parts are shown in neutral position and it is to be assumed that the driving shaft 11 is in operation. Under such conditions and with the teeth 15 thereof in mesh with the dedendum teeth 58 of the sleeve 56, this sleeve through the teeth 57 will drive the member 20 which because of the meshing of its teeth 21 with those of the gear 24 will drive the sleeve 25 and the gear 41 meshing with the gear 27.

In the manipulation of the shift lever 9 to provide "high" and "second" speed gear, said lever is shifted to impart a forward movement to the rod 7 for "high" and a rearward movement to said rod for "second". In these movements of the shift rod, partial movement forward will produce "high" so that the shaft 12 is driven through the clutch, and full movement forward will produce "high" without driving through the clutch. Also a partial movement of this rod rearwardly will produce "second" so that the shaft 12 is driven through the clutch and full movement of this rod rearwardly will produce "second" without driving through the clutch. Thus in mentioning "high" gear I mean a direct or one to one connection between said driving and driven shafts and in mentioning "second" I mean an indirect or differential in ratio connection between said shafts.

A partial forward movement of the rod 7 upon manipulation of the lever 9 in the proper manner will through the yoke 60, shift the sleeve 56 forwardly (see Fig. 2) and because of the connection between said sleeve 56 and the sleeve 52 before mentioned, said sleeve 52 shifts with the same. The extent of this shift is such as to bring the spring pressed pin 55 of the sleeve 52 into engagement with the notch 39 in the cup member 30 and the teeth 53 of said sleeve will move toward but not into engagement with the teeth 40 on the cup member 31 as best shown in Fig. 2. This however, will take the teeth 58 of the sleeve 56 out of engagement with the teeth 15 of the drive shaft 11 and will cause the teeth 53ª of the sleeve 52 to mesh with said teeth 15. The teeth 22 of the member 20 will now engage with the teeth 58 of the sleeve 56 so that the member 56 ceases being driven and the member 52 is driven by the shaft 11. As the sleeve 56 remains non-rotative it is apparent that the jack shaft 26 and the gears thereof are non-rotative.

Thus the drive from the shaft 11 is through its teeth 15 to the teeth 53ª and 53ᵇ of sleeve 52 to the teeth 38 of the cup member 30. This rotates the cup member 30 to actuate and expand the spring 49 to lock or clutch the cup members 30 and 31 together. As the cup member 31 is splined to the shaft 12, the latter is driven as is apparent. Thus the shaft 12 is being driven from the shaft 11 in "high" gear through the clutch spring 49. Should the shaft 12 tend to rotate at a speed greater than that of the shaft 11 as when upon a down grade, the cup member 31 will act to contract the spring 49 to release its clutching action so that the member 31 will overrun the member 30. A further movement of the shift rod 7 in the same direction as that mentioned to its full limit will, as shown in Fig. 3, bring the teeth 53 of the sleeve 52 into engagement with the teeth 40 of the member 31 as shown in Fig. 3 and the dedendum teeth 53 of the sleeve 52 will move into the plane of but not into mesh with the dedendum teeth 23 of the gear 20. Even though the dedendum teeth 58 of the sleeve 56 are in engagement with the teeth 22 of the gear 20, said gear is not being driven thereby so that the jack shaft 26 is still passive or non-rotating. However, power from the shaft 11 through its teeth 15 drives the sleeve 52 which through its teeth 53 and the teeth 40 on the cup member 31 will drive said cup member. As this cup member is splined to the shaft 12 the same is being driven but as power is being transmitted to the cup member 31 instead of the cup member 30, the clutch spring 49 is inoperative.

It is apparent that with the parts in the position shown in Fig. 3, after a full movement of the shift rod 7 in the forward direction, the drive is from the shaft 11, through the sleeve 52 to the cup member 31 to the shaft 12 and the jack shaft remains non-rotative. With the parts as shown in Fig. 2 after only a partial movement of the shift rod 7, the drive is through the shaft 11 to the sleeve 52 and to the cup member 30 and clutch spring 49 to the cup member 31 and to the shaft 12. Thus with the parts as last mentioned, it is apparent that should the shaft 12 tend to rotate at a speed greater than that of the shaft 11, the cup member 31 will overrun the spring 49 to accommodate such relative difference in rotations between the shafts 12 and 11 so that free wheeling is possible. This free wheeling is obtained merely by moving the lever 9 only a part way of its full shifting movement in one direction. Thus in one instance a direct drive or high gear with free wheeling is possible when so desired and in another instance a direct drive or high gear without free wheeling is possible and in both instances, the jack shaft and its associated gears remain passive or non-rotative.

Assume now that it is desired to bring the parts once again into the relative position shown in Fig. 2. The lever 9 is actuated to shift the rod 7 rearwardly and this through the yoke 60 shifts the sleeve 56 rearwardly so as to press or engage its cone shaped surface 63 against the like surface 54 of the sleeve 52. However, rearward movement of the sleeve 52 under such conditions is resisted by the holding action of the spring pressed detent 55 in the notch 39 of said sleeve. This resistance causes an engagement between said cone shaped clutch surfaces 63—54 whereby the driving action on the sleeve 52 (through the teeth 53a—15) will be transmitted through said clutch surfaces to the sleeve 56 thus starting rotation of the teeth 58 thereof previous to an attempt to engage the same with the teeth 15 on the driving shaft so that upon sufficient pressure the sleeve 56 will cause the spring pressed detent 55 to slip out of its notch 39 to restore the parts to neutral position. Thus in the shifting from the positions shown in Figs. 2 and 3 back to neutral as shown in Fig. 1, said detent by its engagement in the notch 39 will synchronize the teeth 15—22—23 previous to completing full movement back into neutral as shown in Fig. 1.

To obtain second gear or an indirect drive through the clutching action of the spring 49 upon the cup member 30—31, the lever 9 is manipulated to shift the sleeve 56 rearwardly for a part of its movement and thus through the tapered or coned surfaces 63 and 54 will impart a similar movement to the sleeve 52.

In this movement of the parts, the teeth 53 on the sleeve 52 will move into engagement with the teeth 42 of the gear 41 as best shown in Fig. 4. This also brings the teeth 58 of the sleeve 56 over but not in engagement with the dedendum teeth 38 on the front end of the cup member 30 and the teeth 53b of the sleeve 52 are moved into engagement with the teeth 38 on the rear end of the cup member 30.

With the parts in this position, the shaft 11 (through teeth 15 and 58) drives the sleeve 56 which (through teeth 57 and 22) drives the gear 20. This gear will drive the sleeve 25 on the jack shaft 26, and through the gear 27 thereof will drive the gear 41. As the teeth 42 of this gear are engaged by the teeth 53 of the sleeve 52, said sleeve through the teeth 53b and dedendum teeth 38 on the rear end of the cup member 30, will energize the spring 49 to clutch the cup member 30 to the companion member 31 which has the splined connection with the shaft 12. Thus with the parts in this position as is shown in Fig. 4, the shaft 12 is driven at second speed through the clutch so that if said shaft now tends to rotate at a speed greater than that of the shaft 11 as is possible upon a down grade, the cup member 31 overruns the cup member 30 to give the free wheel action.

Figure 5:
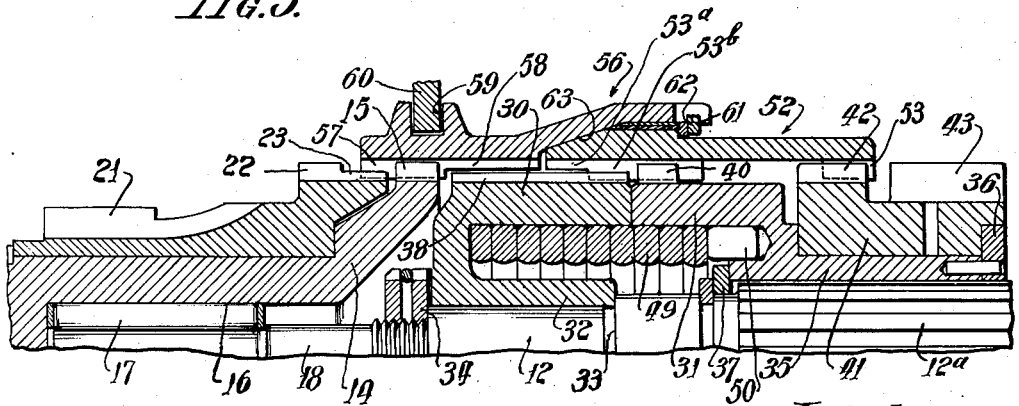

Should it be desired to obtain second gear for the shaft 12 without driving through the clutch as just above described, the rod 7 is moved further rearwardly to the full limit of movement to shift the sleeve 52 further rearwardly and to bring the teeth 53 of said sleeve into engagement with the teeth 42 of the gear 41 as best shown in Fig. 5. In this movement of the sleeve the teeth 53b move into engagement with the teeth 40 of the cup member 31 and into engagement with the teeth 38 of the cup member 30 and this without disengaging the teeth 53 from the teeth 42. Thus the gear 41 drives the sleeve 52 through the teeth 53 and this sleeve 52 through the teeth 53b and teeth 40 drives the cup member 31. In this drive, the clutch spring 49 is inoperative and as the cup member 31 is splined to the shaft 12, the same is driven at second speed independent of the clutch.

As to "low" and "reverse", these speed changes are accomplished by manipulating the shift lever to impart movement to the rod 8, which through the fork 48 shifts the gear 44 into mesh with the gear 28 on the sleeve 25 or into mesh with the reverse gear 45 which in turn meshes with the gear 29 on the sleeve on the jack shaft.

It is apparent that with the improved transmission it is possible to have either an overrun connection or a non-overrun connection between the driving and the driven shafts in high gear or in second gear.

The improved construction is actuated in the same manner as the conventional transmissions as now used in automobiles, the only difference being that for free wheeling in either high or second, the shift lever is not moved its full distance as when high or second is desired without free wheeling.

By reason of the jack shaft sleeve remaining passive when the transmission is in high, wear on the gears is reduced, the transmission is more quiet, shifting is easier when transmission lubricant is stiff due to low temperature and this lubricant is not heated up so rapidly due to friction between the constantly rotating and meshing of gears in all change gear ratios possible with the transmission.

While in describing my invention, I have referred in detail to the form, arrangement and construction of the several parts thereof, the same is to be considered as illustrative only so that I do not wish to be limited thereto except as may be specifically set forth in the appended claims.

I claim as my invention:—

1. A transmission embodying therein a driving shaft, a driven shaft and a jack shaft element, a member associated with the driving shaft and having a connection with the jack shaft element, an overrunning clutch operable to provide a direct driving connection between the driving and driven shafts, and means for locking said clutch in or out of operation in said direct driving connection, a part of said means being so formed with respect to said member as to be engaged therewith but inoperative to transmit power thereto to drive the jack shaft during such direct driving connection between the driving and driven shafts.

2. A transmission embodying therein a driving shaft, a driven shaft and a jack shaft element, a member associated with the driving shaft and having a constant mesh engagement with the jack shaft element, an overrunning clutch operable to provide a direct driving connection between the driving and the driven shafts, and means for locking said clutch in or out of operation when providing said direct driving connection, a part of said means being so formed with respect to said member as to be engaged therewith but inoperative to impart power to said member on the driving shaft which is rendered inoperative to drive the jack shaft element during said direct driving connection between the driving and driven shafts.

3. A transmission embodying therein a driving shaft, a driven shaft and a jack shaft element having gears thereon, a gear mounted on the driving shaft and in constant mesh with one of the gears on the jack shaft element, an overrunning clutch operable to provide a direct connection between the driving and driven shafts, and means for locking said clutch in or out of operation when providing said direct driving connection, a part of said means being so formed with respect to said gear on said driving shaft as to be engaged therewith but inoperative to impart power to said gear which is rendered inoperative to drive the jack shaft element during such direct connection between the driving and driven shafts through said clutch.

4. A transmission embodying therein a driving shaft, a driven shaft and a jack shaft element, a member on the driving shaft having a constant driving connection with the jack shaft element, means rotative with respect to the driven shaft and driven from the jack shaft element, an overrunning clutch operable to provide a direct driving connection between the driving and driven shafts or an indirect driving connection between said driving and driven shafts through the jack shaft element and said means rotative with respect to the driven shaft, and means for locking said clutch in or out of operation when providing said direct driving connection, a part of said last mentioned means being so formed with respect to the member on the driving shaft as to be engaged therewith but ineffective to impart power to said member on the driving shaft which is inoperative to drive the jack shaft element during the direct driving connection between the driving and driven shafts through or independent of the clutch, said part of said clutch locking means during the indirect driving connection between the driving and driven shafts, through or independent of the clutch, being operative to drive the jack shaft element through the member on the driving shaft.

5. A transmission embodying therein a driving shaft, a driven shaft and a jack shaft element having gears thereon, a gear on the driving shaft and in constant mesh with one of the gears on the jack shaft element, a gear loose on the driven shaft meshing with a gear on the jack shaft element, an overrunning clutch operable to provide a direct driving connection between the driving and driven shafts or an indirect driving connection between said driving and driven shafts through the jack shaft element and the before mentioned gears and means for locking the clutch in or out of operation when providing said direct driving connection, a part of said last mentioned means being so formed with respect to the gear on the driving shaft as to be engaged therewith but ineffective to impart power to said gear which is inoperative to drive the jack element during the direct driving connection between the driving and driven shafts through or independent of the clutch, said part of the clutch locking means during the indirect driving connection between the driving and driven shafts through or independent of the clutch, being operative to drive the jack shaft element through one of the gears thereon and the gear on the driving shaft.

6. A transmission embodying therein a driving shaft, a driven shaft and a jack shaft element having gears thereon, a gear fixed with respect to the driving shaft and a second gear loose thereon and in constant mesh with one of the gears on the jack shaft element, a clutch on the driven shaft and including a member fixed thereto and a second member rotative thereon together with means acting in a relative rotation of said members in one direction to clutch them together, and a longitudinal shiftable means operative to provide either a direct or an indirect connection between said gear fixed on the driving shaft and the clutch member fixed on the driven shaft, or a direct or an indirect driving connection between said gear loose on the driving shaft and both clutch members and their coacting clutching means to said driven shaft, said gear loose on the driving shaft being inoperative to drive the jack shaft element when said driven shaft is connected directly to the driving shaft either through or independent of the clutch but being operative to drive said jack shaft element when said driven shaft is indirectly connected to the driving shaft either through or independent of said clutch.

7. A transmission embodying therein, a driving shaft, a driven shaft and a jack shaft element having gears thereon, a gear fixed on the driving shaft and a second gear loose thereon and in constant mesh with one of the gears on the jack shaft element, an overrunning clutch on said driven shaft including a member fixed thereon and a second member rotative thereon, and one of said members being in constant engagement with another gear on the jack shaft element, longitudinally shiftable means operative in a part of its movement in one direction to connect directly the driven shaft to the driving shaft through said clutch and operable in the remainder of its movement in said direction to directly connect said driven shaft to the driving shaft independent of said clutch, said gear loose on the driving shaft being inoperative to drive the jack shaft element when the driven shaft is being directly driven from the driving shaft either through or independent of the clutch.

8. In a transmission, a driving shaft and a driven shaft, a clutch member fixed on the driving shaft, means providing coacting clutch parts one loose and the other fixed on the driven shaft, means coacting with said clutch parts to clutch them together, means surrounding said clutch parts and said clutch member fixed on the driving shaft and shiftable to provide a direct driving connection between said clutch member and the clutch part fixed on the driven shaft, or between said clutch member and the clutch part loose on the shaft, to drive the driven shaft directly from the driving shaft either independent of or through said means clutching said clutch parts together in a relative rotation between them.

9. In a transmission, a driving shaft and a driven shaft, a clutch member fixed on the driving shaft, means providing coacting clutch parts one loose and the other fixed on the driven shaft, each of said clutch parts and said clutch member having teeth thereon, means coacting with said clutch parts to clutch them together in a relative rotative movement in one direction, and means surrounding said clutch parts and said clutch member and longitudinally shiftable thereon and having teeth adapted to engage the teeth on said clutch member and clutch parts respectively to connect the driven shaft to the driving shaft directly through the clutch part on said driven shaft or to connect the driven shaft to the driving shaft through both of said clutch parts.

10. In a transmission, a driving shaft having clutch teeth fixed thereon, a driven shaft, a jack shaft element having gears thereon, a gear loose on the driving shaft and in constant mesh with one of the gears on the jack shaft, means providing coacting clutch parts loose and fast respectively on the driven shaft, and each of said clutch members having teeth thereon, means coacting with the clutch members to clutch them together in a relative rotative movement between them in one direction, and means comprising two relatively rotative sleeves, surrounding said clutch members but connected together for simultaneous endwise movement, one of said sleeves having teeth to engage the clutch teeth and loose gear on the driving shaft when said means is shifted partially in one direction and the other of said sleeves having teeth to engage the clutch teeth fixed to the driving shaft and those of that clutch member loose on the driven shaft when said means has so been partially shifted, said means when further shifted in the same direction connecting said clutch teeth on the driving shaft directly to the teeth of that clutch member fixed to said driven shaft.

11. In a transmission, a driving shaft and a driven shaft, clutch teeth on the driving shaft, fast and loose members on the driven shaft coacting to provide an interior clutch chamber and having teeth on their exterior, a spring in said chamber acting to clutch said members together in a relative rotative movement between them in one direction, and a sleeve surrounding said clutch members and longitudinally shiftable thereon and having teeth constantly in mesh with the clutch teeth on the driving shaft, said sleeve when partially shifted in one direction, acting through the clutch member loose on the driven shaft to connect both clutch members thereto through the clutch spring, and said sleeve when further shifted in said direction acting through the teeth on the fixed clutch member to connect said fixed clutch member directly to the clutch teeth on the driving shaft independent of the clutch spring.

12. In combination, a driving member, a driven member, an annular member mounted on one of said members and rotatable therewith, a drum rotatably mounted relatively to said annular member, an overrunning clutch for connecting said drum to said annular member, and a clutching member mounted on said drum and axially movable thereon to connect said driving and driven members through said overrunning clutch and by continued movement to connect said driving and driven members independently of said overrunning clutch.

13. The combination with driving and driven shafts, of an annular member mounted on said driven shaft and rotatable therewith, a drum rotatably mounted relatively to said annular member, an overrunning clutch for connecting said drum to said annular member, and a clutching member mounted on said drum and axially movable thereon to connect said shafts through said overrunning clutch and by a continued movement to connect said shafts independently of said overrunning clutch.

14. The combination with a driving member and a driven member, of means for drivingly connecting said members comprising an annular member drivingly connected with one of said members, clutch teeth on said annular member, a hollow member adapted for driving connection with the other of said driving or driven members, overrunning clutch means drivingly connecting said annular and hollow members for a one-way drive, axially disposed teeth formed on the periphery of said hollow member and a sleeve member surrounding said hollow member having internal teeth engaging with the teeth on the hollow member and adapted to engage with the teeth on the annular member to drivingly connect said driving and driven members for a two-way drive.

15. The combination with a driving and a driven member, of a clutch body drivingly connected to one of said members, peripheral teeth on said clutch body, a cylindrical clutch body adapted for connection with the other member, a coiled spring engageable with each of said bodies for establishing a one-way drive between said bodies, axially disposed teeth formed on said cylindrical clutch body and a hollow sleeve surrounding said cylindrical body, internal teeth on said sleeve engaging the teeth on said cylindrical body and axially movable into engagement with the peripheral teeth on said other clutch body to establish a two-way drive between said bodies.

16. The combination with a driving member and a driven member, of a clutch body drivingly connected to one of said members having an annular clutch portion, clutch teeth on said clutch body, a hollow cylindrical clutch body adapted for connection with the other member, a clutch spring within said annular clutch portion and said hollow cylindrical clutch body connected to one of the same and having a plurality of convolutions, more than one of which are adapted to be varied in diameter to drivingly engage said annular clutch portion and cylindrical clutch body to establish a one-way drive between said clutch bodies, axially disposed teeth on the periphery of said cylindrical clutch body, a sleeve surrounding said cylindrical clutch body, internal teeth formed on said sleeve and meshing with the teeth on said body and axially movable into engagement with the teeth on said first mentioned clutch body to establish a two-way drive between said clutch bodies.

17. In combination, a driving and a driven member, a clutch member drivingly connected with one of said members having an internal cylindrical friction surface, a hollow cylindrical clutch member adapted to be connected with the other of said driving or driven members having an internal friction surface, each of said clutch members having peripheral axially extending clutch teeth, a clutch spring having a plurality of convolutions more than one of which are adapted to be varied to drivingly engage said friction surfaces to establish a one-way drive between said clutch members, a sleeve surrounding said cylindrical clutch member, internal teeth on said sleeve slidably engaging the teeth on said cylindrical clutch member and engageable by axial movement with the teeth on the first mentioned clutch member to establish a two-way drive between said clutch members.

18. In a vehicle transmission, a pair of aligned shafts, a one-way clutch mounted on one of said shafts and operatively engageable with the other of said shafts to provide a one-way driving connection between said shafts, said one-way clutch comprising, a pair of cylindrical members, one rotatably and the other non-rotatably mounted on said one shaft, spring means for locking said members together when power is applied to said rotatably mounted member, and an outer sleeve slidable on said cylindrical members and adapted to operatively connect said rotatably mounted member to said other shaft.

CLARENCE H. BARTON.